Sept. 6, 1966  T. H. OSTER  3,271,647
INDUCTION MOTOR
Filed Aug. 1, 1963
2 Sheets-Sheet 1
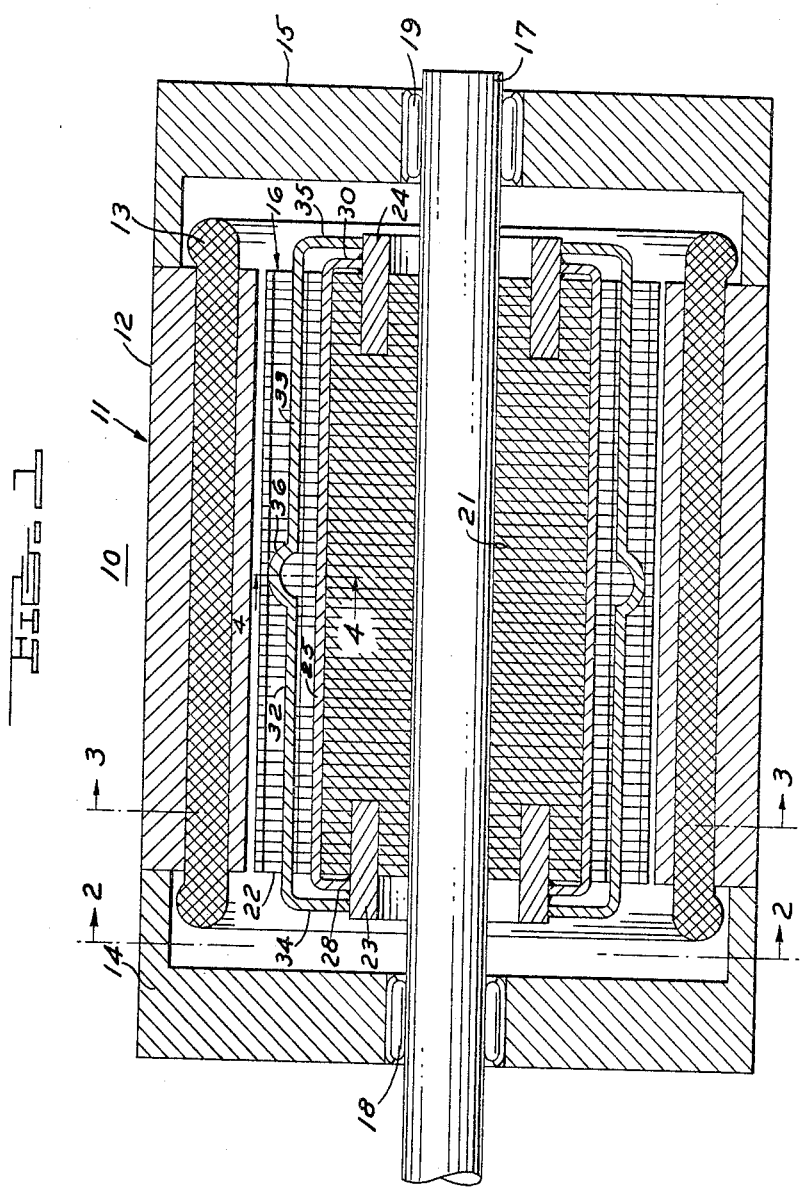
THOMAS H. OSTER
INVENTOR.
BY John R. Faulkner
Keith L. Zerschling
ATTORNEYS Sept. 6, 1966
T. H. OSTER
3,271,647
INDUCTION MOTOR
Filed Aug. 1, 1963
2 Sheets-Sheet 2
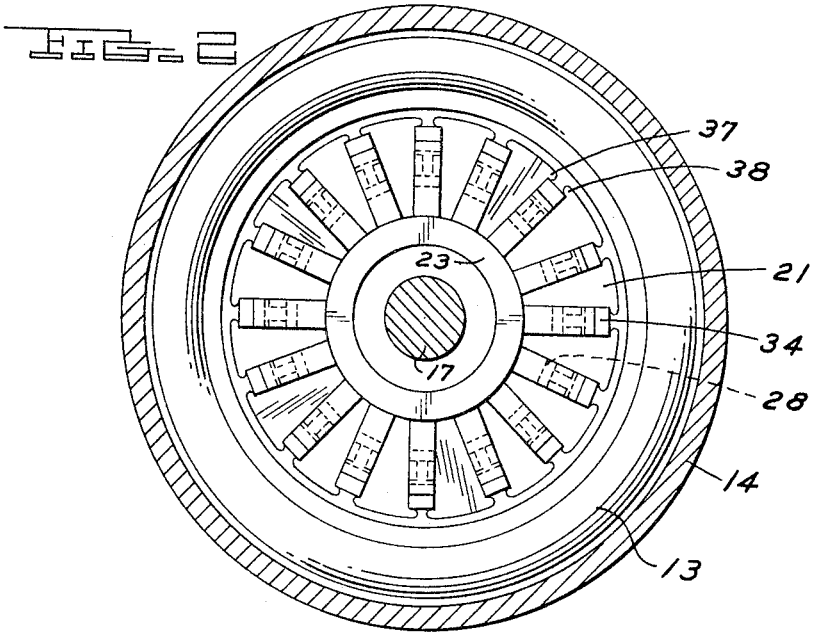
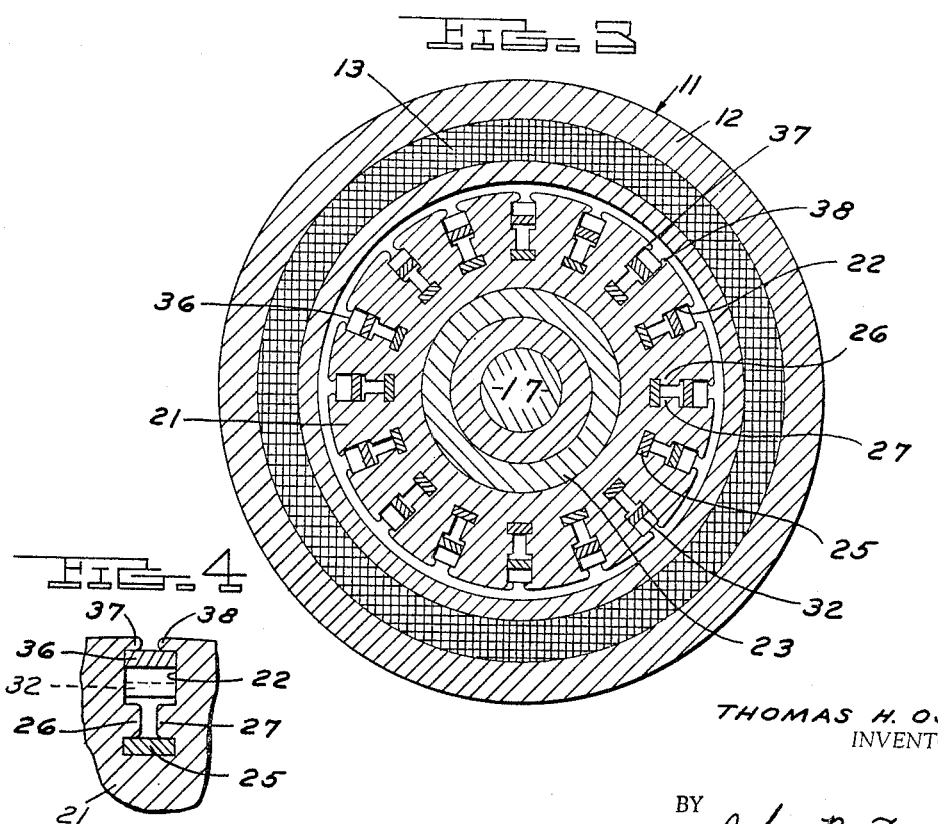
THOMAS H. OSTER
INVENTOR.
BY John R. Faulkner
Keith L. Zerschling
ATTORNEYS

United States Patent Office 3,271,647
Patented Sept. 6, 1966

3,271,647
INDUCTION MOTOR
Thomas H. Oster, Dearborn, Mich., assignor to The Ford Motor Company, Dearborn, Mich., a corporation of Delaware
Filed Aug. 1, 1963, Ser. No. 299,413
9 Claims. (Cl. 318—234)

This invention relates to an induction motor and to a rotor employed with an induction motor. More particularly, it relates to an induction motor that will maintain essentially constant speed despite wide variations in load and the frequency of the electrical energy supplied to drive the motor.

The induction motor is admirably suited for use in areas where simplicity of structure and low cost are essential, as is true in the automotive vehicle industry where vehicles are produced on a mass production basis. In an automotive vehicle the alternator, as opposed to a conventional direct current generator, is coming into widespread use. With such use the induction motor becomes practicable for the operation of power operated windows and power operated seats. The frequency of the electrical energy produced by the alternator, however, varies over wide frequency limits. For example, in a conventional automotive vehicle it may vary over a range of 10:1, since the idle speed of the engine that drives the alternator is approximately one-tenth that of its top rated speed.

In the operation of power windows and power seats, it is desirable that the electric motor that operates these devices maintain a substantially constant speed. The speed of an induction motor, however, depends primarily upon the frequency of the energy supplied to the stator windings, and speed control is rather a difficult problem if the frequency of supply varies over wide limits.

This invention is concerned with the modification of a conventional induction motor to provide a substantially constant speed despite wide variations in the frequency of the supply voltages applied to the stator windings. The induction motor of the invention will also maintain a substantially constant speed despite large variations in the load driven by the motor.

To accomplish the above mentioned purposes, the rotor of the induction motor is provided with a plurality of short circuited windings. Means are provided for open circuiting a certain portion of these short circuited windings when the angular velocity of the rotor exceeds a given level. This open circuiting of certain of the short circuited windings reduces the torque developed by the motor and controls or limits the speed to a predetermined level.

In the preferred embodiment of the invention, the rotor is provided with flexible speed limiting conductors, preferably made of heavy bronze or brass, located in the armature slots. These speed limiting flexible conductors flex at central curved portions under the influence of centrifugal force. The ends of these flexible conductors are positioned in electrical contact with short circuiting rings provided at either end of the rotor. When the rotor reaches a predetermined angular velocity, centrifugal force lifts the ends of these flexible conductors clear of the short circuiting rings and effectively removes the flexible speed limiting conductors from the rotor circuit. The rotor is preferably provided with minimum speed conductors that are permanently connected to the short circuited rings for the purpose of assuring a minimum speed for the motor and for suppressing any arcing that may occur as the flexible speed conductors are disconnected from the short circuiting rings.

An object of the invention is the provision of an induction motor that will maintain essentially constant speed despite wide variations in the load driven by the motor and in the frequency of the energy supplied to the motor.

Another object of the invention is the provision of a rotor for an induction motor that includes means for assuring an essentially constant speed for the rotor despite wide variations in the load driven by the motor and in the frequency of the energy supplied to the stator windings of the induction motor.

Other objects and attendant advantages of the invention will become more apparent as the specification is considered in connection with the attached drawings, in which:

FIGURE 1 is a longitudinal sectional view through the induction motor of the invention;

FIGURE 2 is taken along the lines 2—2 of FIGURE 1 and shows an end view of the rotor of the invention;

FIGURE 3 is a sectional view taken along the lines 3—3 of FIGURE 1; and

FIGURE 4 is a partial sectional view of the rotor taken along the lines 4—4 of FIGURE 1.

Referring now to the drawings in which like reference numerals designate like parts throughout the several views thereof, there is shown in FIGURE 1 an induction motor 10 comprised of stator 11 having a central portion 12 carrying armature or stator windings 13. The stator 11 also includes a front housing 14 and a rear housing 15 suitably affixed to the central portion 12 by means not shown. The stator 11 of the induction motor 10 is conventional, and the stator or armature windings 13 may be a three phase winding wound to produce any given number of poles.

The rotor 16 of the induction motor 10 includes a shaft 17 rotatably mounted in the front housing 14 and the rear housing 15 by means of bearings 18 and 19. A standard laminated rotor core 21 is affixed to the shaft 17. The rotor core 21 includes a plurality of radial slots 22 positioned about the periphery of the core. Short circuiting rings 23 and 24 constructed of a conductive material are imbedded in the rotor core 21 at either end of the rotor core. These short circuiting rings are positioned radially inwardly of the slots 22.

Each slot 22 contains a first conductor 25 positioned in the bottom of the slot as it is viewed in FIGURE 1. In each of the other slots 22 the conductor 25 is positioned at that portion of the slot most closely adjacent to the shaft 17. The slot 22 is formed to provide a pair of inwardly extending protuberances 26 and 27 that narrow the slot and hold the first conductor 25 in place radially in the slot. The ends of each of the conductors 25, shown at 28 and 30, are permanently electrically connected to the short circuiting rings 23 and 24 by any suitable means, for example, by welding.

A second conductor 32 is also positioned in each of the slots 22. Each of the conductors 32 comprises a main body portion 33 and end portions 34 and 35 that are substantially perpendicular to the main body portion 33 and that are directed radially inwardly from the main body portion 33. The main body portion 33 has a curved central portion 36 that is curved radially outwardly with respect to the main body portion 33 of the conductor. As can best be seen by reference to FIGURE 3, the main body portion 33, with the exception of the central curved portion 36, is positioned radially outwardly of the inwardly extending protuberances 26 and 27 of the slot 22 with just a small amount of clearance. The outermost portion or top of each slot 22 is narrowed by a pair of inwardly extending protuberances 37 and 38. The apex of the central curved portion 36 is positioned in engagement with these protuberances, as best shown in FIGURES 1 and 4. When the rotor 16 is at a standstill and when it is rotating at an angular velocity below a predetermined value, the ends 34 and 35 of each of the second conductors 32 are in electrical contact with the short circuiting rings 23 and 24. Good electrical contact is assured by stressing the second conductors 32 at the central curved portion 36 so that the ends 34 and 35 of the second conductors 32 engage the short circuiting rings 23 and 24 with considerable force.

When the induction motor is energized by applying an alternating current source to the stator windings 13, the conductors 25 and 32 are short circuited and provide the short circuited windings of the rotor necessary for operation as an induction machine. When the rotor 16 reaches a predetermined speed level, the centrifugal force acting on the second conductors 32 will cause these conductors to flex about their curved central portions 36 and lift the ends 34 and 35 of these conductors from the short circuiting rings 23 and 24. This action causes the conductors 32 to be open circuited and removes them from the rotor circuit. As a result, the electromagnetic torque developed by the rotor is reduced and the speed of the rotor is correspondingly reduced. The reduction of the speed may be sufficient to again bring the ends 34 and 35 of the conductors 32 into contact with the short circuiting rings 23 and 24. In such case, the rotor will again speed up to the point where the centrifugal force is sufficient to lift the ends 34 and 35 clear of the short circuiting rings 23 and 24. This is a typical hunting action that is characteristic of centrifugally actuated governors and regulators.

The conductors 32 are preferably formed of heavy brass or bronze and preferably carry the majority of the induced current in the rotor when the speed of the rotor is below that at which the ends 34 and 35 of the conductors 32 lift clear of the short circuiting rings 23 and 24. The conductors 32 are flexible speed limiting conductors since these conductors flex about the curved central portions 36 and since the speed of the rotor 16 is limited when the ends 34 and 35 of conductors 32 lift clear of the short circuiting rings 23 and 24. The conductors 25 serve the purpose of assuring a minimum speed for the rotor and they also suppress arcing that may occur when the ends 34 and 35 of the conductors 32 lift off the short circuiting rings 23 and 24. The rotor can be designed by methods well known to those skilled in the art so that the end portions 34 and 35 of the conductors 36 lift from the short circuiting rings 23 and 24 at any predetermined speed level.

The induction motor of this invention may be employed in an automotive vehicle to operate power windows and seats. In this case the stator windings 13 would be connected directly to the output windings of the alternator. This alternator is driven by the vehicle engine and may produce electrical energy having a frequency ranging from approximately 45 to 450 cycles per second. The rotor may be designed so that the speed of the rotor is limited to an angular velocity consistent with a frequency of energy from the alternator in the range of 55–60 cycles per second. The induction motor will thus operate at substantially constant speed over substantially all of the frequency range of electrical energy produced by the alternator.

It should be understood also that the rotor 16 can be constructed without the use of the first or minimum speed conductors 25. In this construction the second conductors 32 in cooperation with the stator windings 13 will supply all of the electromagnetic torque to the rotor 16. Theoretically, when the rotor 16 reaches the speed at which centrifugal force is great enough to move the ends 34 and 35 of the conductors 32 from the short circuiting rings 23 and 24, the rotor 16 would be de-energized. Since a plurality of conductors 32 are positioned around the periphery of the machine, however, it will be understood that ends 34 and 35 of certain of the conductors 32 will move outwardly before others and thus provide proper speed regulation without completely de-energizing the rotor 16.

The invention thus provides an induction motor that will maintain essentially constant speed despite wide variations in load and in the frequency of the electrical energy supplied to the motor. It also provides a rotor suitable for use in such an induction motor.

It will be understood that the invention is not to be limited to the exact construction shown and described, but that various changes and modifications may be made without departing from the spirit and scope of the invention as defined in the appended claims.

I claim:

1. A rotor for an induction motor comprising, a shaft, a rotor core mounted on said shaft, a plurality of slots positioned in said rotor core, each of said slots having a conductor positioned therein, a short circuiting ring positioned at each end of said rotor core, the ends of said conductor in each of said slots being in electrical contact with said short circuiting rings, said conductors including bendable means positioned intermediate the ends thereof actuated by centrifugal force for moving the ends of at least some of said conductors out of engagement with said short circuiting rings when said rotor is revolved at a predetermined angular velocity.

2. A rotor for an induction motor comprising, a shaft, a rotor core mounted on said shaft, a plurality of permanently short circuited windings mounted on said armature core, said rotor core having a plurality of slots positioned in its outer periphery, a short circuiting ring carried by said rotor core at each end of said rotor core, a flexible conductor positioned in each of said slots, said flexible conductor having a central bendable portion engaging said rotor core and having end portions electrically contacting said short circuiting rings, said end portions being free to move radially outwardly about said central bendable portion and out of contact with said short circuiting rings under the influence of centrifugal force.

3. A rotor for an induction motor comprising, a shaft, a rotor core mounted on said shaft, a plurality of slots positioned in said rotor core, each of said slots having a first conductor and a second conductor positioned therein, said first conductor being positioned radially inwardly from said second conductor, a short circuiting ring positioned at each end of said rotor core, the first conductor in each of said slots being permanently electrically connected to said short circuiting rings, the ends of the second conductors in each of said slots being in electrical contact with said short circuiting rings, said second conductors including means actuated by centrifugal force for moving the ends of said second conductors out of electrical contact with said short circuiting rings when said rotor is revolved at a predetermined angular velocity.

4. A rotor for an induction motor comprising, a shaft, a rotor core mounted on said shaft, a plurality of permanently short circuited windings mounted on said armature core, said rotor having a plurality of axially extending slots positioned in its outer periphery, a short circuiting ring carried by said rotor core at each end of said rotor core, said short circuiting rings being positioned radially inwardly from said plurality of slots, a flexible conductor positioned in each of said axially extending slots, said flexible conductor including a main body portion lying in one of said slots and radially inwardly extending end portions electrically contacting said short circuiting rings, said main body portion having a radially outwardly curved central portion, means on said rotor engaging said radially outwardly curved central portion of said flexible conductor for preventing radial outward movement of said radially outwardly curved central portion, said flexible conductors flexing outwardly about said radially outwardly curved central portion whereby said end portions move radially outwardly out of engagement with said short circuiting rings when said rotor is rotated above a predetermined angular velocity.

5. An induction motor comprising a stator, armature windings carried by said stator and adapted to be energized by a source of electrical energy having a wide range of frequencies, a rotor rotatably mounted in said stator, said rotor having a plurality of slots positioned therein, a short circuiting ring positioned at each end of said rotor, a conductor positioned in each of said slots and having end portions positioned in electrical contact with said short circuiting rings, said conductors including bendable means positioned intermediate the ends thereof, engaging said rotor core and actuated by centrifugal force for moving the ends of at least some of said conductors out of engagement with said short circuiting rings when said rotor is rotated above a predetermined angular velocity whereby the speed of the rotor is limited to a preselected maximum level.

6. A rotor for an induction motor comprising, a shaft, a rotor core mounted on said shaft, a short circuited loop mounted on said rotor, said short circuited loop comprising a first conductor constructed of conductive material and a second conductor constructed of conductive material, said conductors being positioned in mechanical and electrical engagement, one of said conductors including means actuated by centrifugal force for moving a portion of said conductor radially outwardly to break electrical contact between said two conductors and open circuit said short circuited loop.

7. A rotor for an induction motor comprising, a shaft, a rotor core mounted on said shaft, a short circuited loop positioned on said rotor core and including a flexible conductor positioned in mechanical and electrical engagement with another portion of said short circuited loop, said flexible conductor including means actuated by centrifugal force for moving said flexible conductor out of engagement with the other portion of said short circuited loop when said rotor is rotated above a predetermined angular velocity.

8. A rotor for an induction motor comprising, a shaft, a rotor core mounted on said shaft, a short circuited loop positioned on said rotor core and including a conductor positioned on said rotor core in a direction generally parallel to the axis of said rotor, said conductor including a bendable portion, said short circuited loop including a stationary conductor, the end of said bendable portion of said conductor engaging said stationary conductor, said bendable portion of said conductor including bendable means actuated by centrifugal force for moving the end of said bendable portion of said conductor radially outwardly out of engagement with said stationary conductor when said rotor is rotated above a predetermined angular velocity.

9. An induction motor comprising a stator, armature windings carried by said stator and adapted to be energized by a source of electrical energy having a wide range of frequencies, a rotor rotatably mounted in said stator, said rotor carrying a plurality of short circuited conductors, said short circuited conductors having end portions movable in a radial direction, a stationary conductor mounted on said rotor, said end portions electrically and mechanically engaging said stationary conductor, said short circuited conductors including bendable means positioned intermediate the end portions and actuated by centrifugal force for moving said end portions radially outwardly out of engagement with said stationary conductor when said rotor is rotated above a predetermined angular velocity whereby the speed of the rotor is limited to a predetermined maximum level.

References Cited by the Examiner
UNITED STATES PATENTS

| | | | |
|---|---|---|---|
| 945,997 | 1/1910 | Wiard | 318—242 X |
| 1,092,849 | 4/1914 | Nies | 310—212 X |
| 1,762,564 | 6/1930 | Smith | 318—234 X |
| 1,976,598 | 10/1934 | Boothby et al. | 318—242 X |
| 2,748,333 | 5/1956 | Lee | 318—232 |

ORIS L. RADER, *Primary Examiner.*

MILTON O. HIRSHFIELD, *Examiner.*

D. F. DUGGAN, *Assistant Examiner.*